(12) United States Patent
Sakaguchi et al.

(10) Patent No.: US 7,937,553 B2
(45) Date of Patent: May 3, 2011

(54) CONTROLLING VIRTUAL MEMORY IN A STORAGE CONTROLLER

(75) Inventors: Takashi Sakaguchi, Odawara (JP); Toshiya Seki, Odawara (JP); Shintaro Inoue, Odawara (JP)

(73) Assignee: Hitachi, Ltd., Tokyo (JP)

( * ) Notice: Subject to any disclaimer, the term of this patent is extended or adjusted under 35 U.S.C. 154(b) by 663 days.

(21) Appl. No.: 12/007,548

(22) Filed: Jan. 11, 2008

(65) Prior Publication Data

US 2008/0270733 A1 Oct. 30, 2008

(30) Foreign Application Priority Data

Apr. 25, 2007 (JP) ................................. 2007-116125

(51) Int. Cl.
*G06F 12/02* (2006.01)
(52) U.S. Cl. ................. 711/173; 711/170; 711/E12.002
(58) Field of Classification Search .............. 711/6, 147, 711/173, 170, 154, 156, 100
See application file for complete search history.

(56) References Cited

U.S. PATENT DOCUMENTS

| | | | | |
|---|---|---|---|---|
| 5,212,633 A * | 5/1993 | Franzmeier | ..................... | 703/23 |
| 5,652,854 A * | 7/1997 | Wong | ............................ | 711/206 |
| 5,829,041 A * | 10/1998 | Okamoto et al. | ............. | 711/147 |
| 6,081,833 A * | 6/2000 | Okamoto et al. | ............. | 709/213 |
| 6,473,842 B1 * | 10/2002 | Tsutsumi | ...................... | 711/159 |
| 7,047,329 B2 * | 5/2006 | Nakayama et al. | ............. | 710/36 |
| 2005/0132249 A1 * | 6/2005 | Burton et al. | ..................... | 714/5 |

FOREIGN PATENT DOCUMENTS

| | | |
|---|---|---|
| JP | 01-283661 | 5/1988 |
| JP | 09-282233 | 4/1996 |

* cited by examiner

*Primary Examiner* — Mardochee Chery
(74) *Attorney, Agent, or Firm* — Volpe and Koenig, P.C.

(57) ABSTRACT

A storage controller of the present invention partitions and allocates a virtual memory area to each of a plurality of functions operating simultaneously. Microprocessors inside a higher-level communications controller can respectively execute a plurality of program products. A virtual memory created using a local memory is partitioned into a plurality of areas. The partitioned areas are allocated to the respective program products via queues.

14 Claims, 10 Drawing Sheets

CONTROLLING VIRTUAL MEMORY IN A STORAGE CONTROLLER

CROSS-REFERENCE TO RELATED APPLICATIONS

This application relates to and claims priority from Japanese Patent Application No. 2007-116125 filed on Apr. 25, 2007, the entire disclosure of which is incorporated herein by reference.

BACKGROUND OF THE INVENTION

1. Field of the Invention

The present invention relates to a storage controller and a virtual memory control method for a storage controller.

2. Description of the Related Art

Companies and other such organizations use storage controllers to manage large amounts of data. For example, organizations such as financial institutions and hospitals require highly reliable, large-capacity storage controllers due to their need to store data for large numbers of customers for long periods of time. A storage controller that fulfills the demand for both high reliability and large capacity, for example, comprises a large number of hard disk drives, and can provide a host with a storage area based on RAID (Redundant Array of Independent Disks).

A storage controller, for example, is a large-scale system product comprising a large number of physical storage devices (hard disk drives and the like), logical storage devices (logical volumes and so forth), communication channels, control boards, and so forth. In a storage controller, shared memory is used to coordinate and operate a large number of control boards, and control information and management information is shared between the respective control boards.

The respective control boards each comprise a plurality of microprocessors, and at least one local memory. At least a portion of the control information and management information stored in the shared memory is copied in advance to the respective local memories. The plurality of microprocessors inside one control board utilizes the control information and management information copied to local memory to execute various prescribed processes.

A memory size, which exceeds the physical size of a local memory, can be obtained by using a virtual memory mechanism. A virtual memory mechanism can be realized in accordance with a memory management subsystem, which has an operating system (OS). Technology for partitioning and using the storage area of a virtual memory is also known (Japanese Patent Laid-open Nos. 9-282233 and 1-283661).

Neither of the prior arts related to the virtual memories disclosed in the above-mentioned respective Patent Literature is technology directly related to a storage controller. Furthermore, both of the prior arts disclosed in the above-mentioned Patent Literature are technologies for managing a virtual memory, which is utilized by a single microprocessor, and cannot be applied as-is to the management of a virtual memory shared by a plurality of microprocessors. Further, the prior arts disclosed in the above-mentioned Patent Literature are for partitioning and managing a virtual memory utilized by a single microprocessor at a predetermined fixed size, and do not variably control the size of a partitioned area.

A storage controller is a large-scale system product, which provides a logical volume to each of a large number of host computers (hereinafter, hosts), and the corresponding relationship between the respective hosts and the respective logical volumes and the utilization status of a logical volume by the respective hosts will undergo various changes. For example, the size of a logical volume provided to a host is dynamically controlled as needed; the storage contents of a logical volume utilized by a host are copied to a separate logical volume; and a logical volume connected to one host is reconnected to another host. Therefore, a storage controller having such technical properties requires new virtual memory technology.

SUMMARY OF THE INVENTION

Accordingly, an object of the present invention is to provide a storage controller and a storage controller virtual memory control method, which make it possible to variably allocate virtual memory capacity for each of a prescribed plurality of functions realized by a plurality of microprocessors. Yet further objects of the present invention should become clear from the descriptions of the embodiments explained below.

To solve for the above-mentioned problems, a storage controller, which accords with the present invention, and which provides a storage area to a higher-level device, comprises a higher-level communication controller for controlling communications with a higher-level device; a lower-level communication controller for controlling communications between storage devices; and a shared memory area, which is shared by the higher-level communication controller and the lower-level communication controller, the higher-level communication controller and lower-level communication controller respectively comprise a plurality of communication interface units for communicating with a communication partner; a microprocessor, which uses a communication interface to control the transfer of data with a communication partner; and a virtual memory controller for creating a virtual memory to be associated with the storage area of a physical memory, and the virtual memory controller respectively allocates virtual memory capacity to each of a prescribed plurality of functions realized by the respective microprocessors, and variably controls each virtual memory capacity allocated to the respective prescribed functions.

In an embodiment of the present invention, at least a portion of prescribed data stored in a shared memory area for each prescribed function is copied to virtual memory.

In an embodiment of the present invention, the virtual memory controller respectively controls virtual memory capacity allocated to prescribed functions using a capacity management queue for managing the virtual memory capacity prepared for each prescribed function.

In an embodiment of the present invention, the virtual memory controller also manages unused capacity not allocated to any of the respective prescribed functions from among the total capacity of the virtual memory, using an unused capacity management queue for managing unused capacity.

In an embodiment of the present invention, the virtual memory controller allocates virtual memory capacity of at least a threshold or greater to respective prescribed functions using a minimum value management table for respectively managing the thresholds of the virtual memory capacity allocated to each of the respective functions.

In an embodiment of the present invention, a threshold is either automatically or manually set when the configuration of a storage controller has changed.

In an embodiment of the present invention, the virtual memory controller allocates virtual memory capacity of at least the threshold or greater in preset prescribed units to respective prescribed functions.

In an embodiment of the present invention, the virtual memory controller allocates virtual memory capacity of at least the threshold or greater to respective prescribed functions by allocating unused capacity, of the total capacity of the virtual memory, to the respective prescribed functions in preset prescribed units.

In an embodiment of the present invention, the virtual memory controller checks whether or not unused virtual memory capacity exists in a prescribed function to which virtual memory capacity of not less than the threshold has been allocated among the respective prescribed functions, and if unused virtual memory capacity exists, manages this unused virtual memory capacity as unused capacity.

In an embodiment of the present invention, the virtual memory controller respectively checks whether or not unused virtual memory capacity exists in the virtual memory capacities allocated to the respective prescribed functions, and when unused virtual memory capacity exists, manages this unused virtual memory capacity as unused capacity.

In an embodiment of the present invention, the virtual memory controller determines whether or not a prescribed function to which virtual memory capacity of not less than a threshold has been allocated exists among the respective prescribed functions, and (1A) upon detecting a prescribed function to which virtual memory capacity of not less than a threshold has been allocated, (1B) checks whether or not unused virtual memory capacity exists in the virtual memory capacity allocated to this detected prescribed function, and (1C) when it is determined that unused virtual memory capacity exists, manages this unused virtual memory capacity as unused capacity, (2A) when unable to find a prescribed function to which virtual memory capacity of not less than the threshold has been allocated, (2B) checks whether or not unused virtual memory capacity exists in the virtual memory capacities allocated to the respective prescribed functions, and (2C) when unused virtual memory capacity exists, manages this unused virtual memory capacity as unused capacity.

In an embodiment of the present invention, the virtual memory controller allocates unused virtual memory capacity of the virtual memory capacity allocated to the respective prescribed functions to other prescribed functions in preset prescribed units.

In an embodiment of the present invention, the virtual memory controller releases and reuses the oldest virtual memory capacity of the virtual memory capacity allocated to the respective prescribed functions in preset prescribed units.

In an embodiment of the present invention, shared memory area is either one of control memory shared by the higher-level communication controller and the lower-level communication controller, or a storage area inside a storage device shared by the higher-level communication controller and the lower-level communication controller.

In an embodiment of the present invention, prescribed data comprises at least any two or more data of data showing the configuration of a logical volume provided to a higher-level device, data showing the configuration of the storage controller, data showing a pattern of access requests issued from a higher-level device, and data showing the connection configuration between a logical volume provided to a higher-level device and the higher-level device.

A method, which accords with another aspect of the present invention, and which controls the virtual memory inside the storage controller, in which a storage controller comprises a higher-level communication controller for controlling communications with a higher-level device; a lower-level communication controller for controlling communications with storage devices; and a shared memory area, which is shared by the higher-level communication controller and the lower-level communication controller, the higher-level communication controller and lower-level communication controller respectively comprise a plurality of communication interface units for communicating with a communication partner; a plurality of microprocessors, which use a communication interface to control data transfer with a communication partner; and a virtual memory controller for creating a virtual memory to be associated with the storage area of a physical memory, and when the configuration of the storage controller changes, comprises a configuration step for configuring the threshold of virtual memory capacity allocated to each of a prescribed plurality of functions realized by respective microprocessors; an allocation step for variably allocating virtual memory capacity of at least the threshold or greater to each of the respective prescribed functions; and a release step for releasing unused virtual memory capacity of the virtual memory capacity allocated to the respective prescribed functions as unused capacity.

Either all or a portion of the components of the present invention may be capable of being constituted as a computer program. This computer program can be transferred by storing it on a recording medium, or it can be transmitted via the Internet or some other communication network.

DESCRIPTION OF THE PREFERRED EMBODIMENTS

Figure 1:
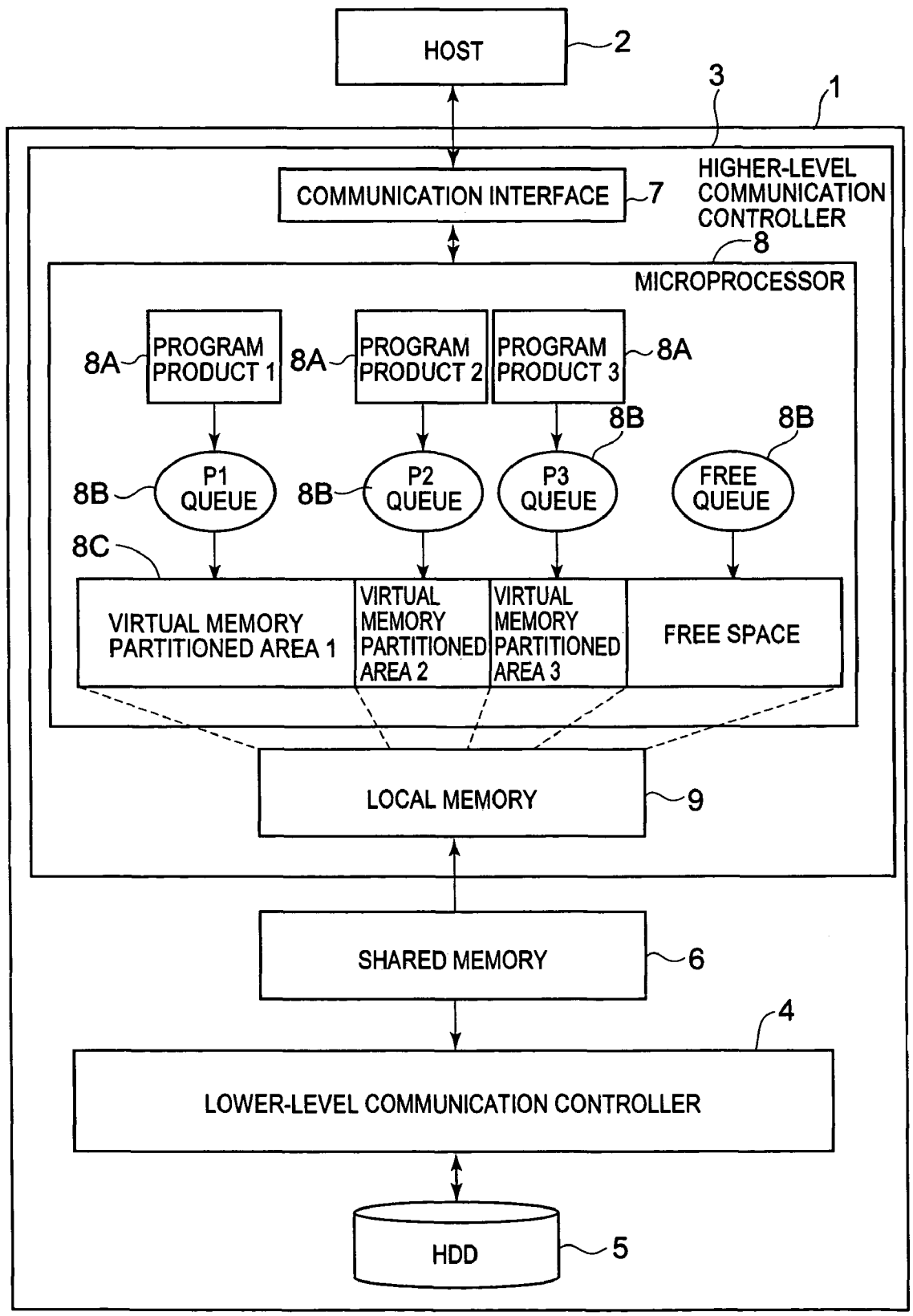
FIG. 1 is a schematic diagram showing the concept of an embodiment of the present invention.

The embodiments of the present invention will be explained below by referring to the figures. FIG. 1 is a schematic diagram showing the overall concept of this embodiment. The storage system shown in FIG. 1, for example, comprises a storage controller 1, and a host computer (hereinafter, host) 2 as a "higher-level device". Furthermore, a separate computer device can also be provided for indicating a configuration change of the storage controller 1.

The storage controller 1, for example, comprises a higher-level communication controller 3, a lower-level communication controller 4, a disk drive 5, and a shared memory 6. The detailed configuration of the storage controller 1 will be explained hereinbelow, but a cache memory can also be disposed in the storage controller 1.

A plurality of higher-level communication controllers 3 and lower-level communication controllers 4 can be disposed in the storage controller 1. A higher-level communication controller 3 controls communications with the host 2. A lower-level communication controller 4 controls communications with the disk drive 5 as the "storage device". The higher-level communication controller 3 and the lower-level communication controller 4 operate by checking and coordinating the progress of processing via the shared memory 6. The internal control programs and communication partners of the higher-level communication controller 3 and the lower-level communication controller 4 differ, but these controllers can be constituted so as to comprise substantially the same configuration. Accordingly, the explanation will focus on the configuration of the higher-level communication controller 3.

The higher-level communication controller 3, for example, comprises a communication interface 7, a microprocessor 8, and a local memory 9 as a "physical memory". A plurality of both communication interfaces 7 and microprocessors 8 are provided, but for convenience of explanation, only one each is shown in FIG. 1.

The microprocessor 8 can respectively execute a plurality of program products 8A. An OS realized in accordance with the microprocessor 8 comprises a memory management subsystem. This memory management subsystem controls a virtual memory 8C using a plurality of virtual memory management queues (hereinafter, may be shortened to just queues) 8B.

Program products 8A can include a program for creating a virtual volume (may be called AOU (Allocation On Use), a program for controlling a data copy, a program for managing the configuration of the storage controller 1, a program for managing the configuration of the communication channel with the host 2, and a program for managing the volume utilization status of the host 2. The above-mentioned program products 8A are just examples, and the present invention is not limited to program products 8A mentioned above.

The physical storage area of the local memory 9, for example, is mapped in units of 512-byte pages to the virtual memory 8C, which is larger in size. The storage area of the virtual memory 8C, for example, is registered in the respective queues 8B in 512-byte page units. Consequently, the storage area of the virtual memory 8C is partitioned into a plurality of areas. The respective partitioned areas are used by the respective program products 8A.

Therefore, a partitioned area of the virtual memory 8C allocated to one program product 8A basically does not affect the partitioned area of the virtual memory 8C allocated to the respective other program products 8A. However, as will become clear from the embodiments described hereinbelow, pages that are utilized with low frequency inside a partitioned area of the virtual memory 8C are removed from this partitioned area and added to another partitioned area.

Of the storage areas of the virtual memory 8C, the area which is not allocated to any program product 8A is an unused storage area. An unused storage area can also be called free space. The respective pages that belong to an unused storage area can be managed by a free queue 8B.

At least a portion of the data inside the shared memory 6 is copied to the respective partitioned areas of the virtual memory 8C in accordance with the program product 8A, which uses the partitioned area. Therefore, the respective program products 8A can execute processing by simply accessing a partitioned area of the virtual memory 8C without accessing the shared memory 6. When a program product 8A uses data that does not reside inside a partitioned area of the virtual memory 8C, the required data is copied from the shared memory 6 to the partitioned area of the virtual memory 8C.

Furthermore, the source for supplying data to the local memory 9 is not limited to the shared memory 6. As in the embodiments described hereinbelow, at least a portion of the data inside the disk drive 5 can also be copied to the local memory 9 and used.

In this embodiment, a hard disk drive 5 is given as an example of a storage device. However, a storage device is not limited to a hard disk drive, and, for example, a semiconductor memory device, optical disk device, magneto-optic disk device, magnetic tape device, flexible disk device and other such nonvolatile storage devices capable of reading and writing data can be used.

When using a hard disk device, for example, an FC (Fibre Channel) disk, SCSI (Small Computer System Interface) disk, SATA disk, ATA (AT Attachment) disk, SAS (Serial Attached SCSI) disk and so forth can be utilized.

When a semiconductor memory device is used as the storage device, for example, a flash memory, FeRAM (Ferroelectric Random Access Memory), MRAM (Magnetoresistive Random Access Memory), Ovonic Unified Memory, RRAM (Resistance RAM) and a variety of other such memory devices can be used. The types of storage devices capable of being used in the present invention are not limited to those cited above, and it should be possible to use other types of storage devices, which will be commercialized in the future.

This embodiment uses the local memory 9, which is shared by the plurality of microprocessors 8 to create the virtual memory 8C, and partitions and provides this virtual memory 8C to the respective program products 8A, which are realized by the respective microprocessors 8.

Therefore, according to this embodiment, it is possible to curb the affect that the virtual memory capacity allocated to a certain program product 8A has on the virtual memory capacity allocated to another program product 8A. Consequently, even when a plurality of program products 8A executed by a plurality of microprocessors 8 coexist and are run simultaneously, the occurrence of hit under miss accesses can be reduced, and the respective program products 8A can be run smoothly. That is, using the virtual memory management technology of this embodiment makes it possible to effectively utilize a virtual memory 8C of a limited size. This embodiment will be explained in detail hereinbelow.

First Embodiment

Figure 2:
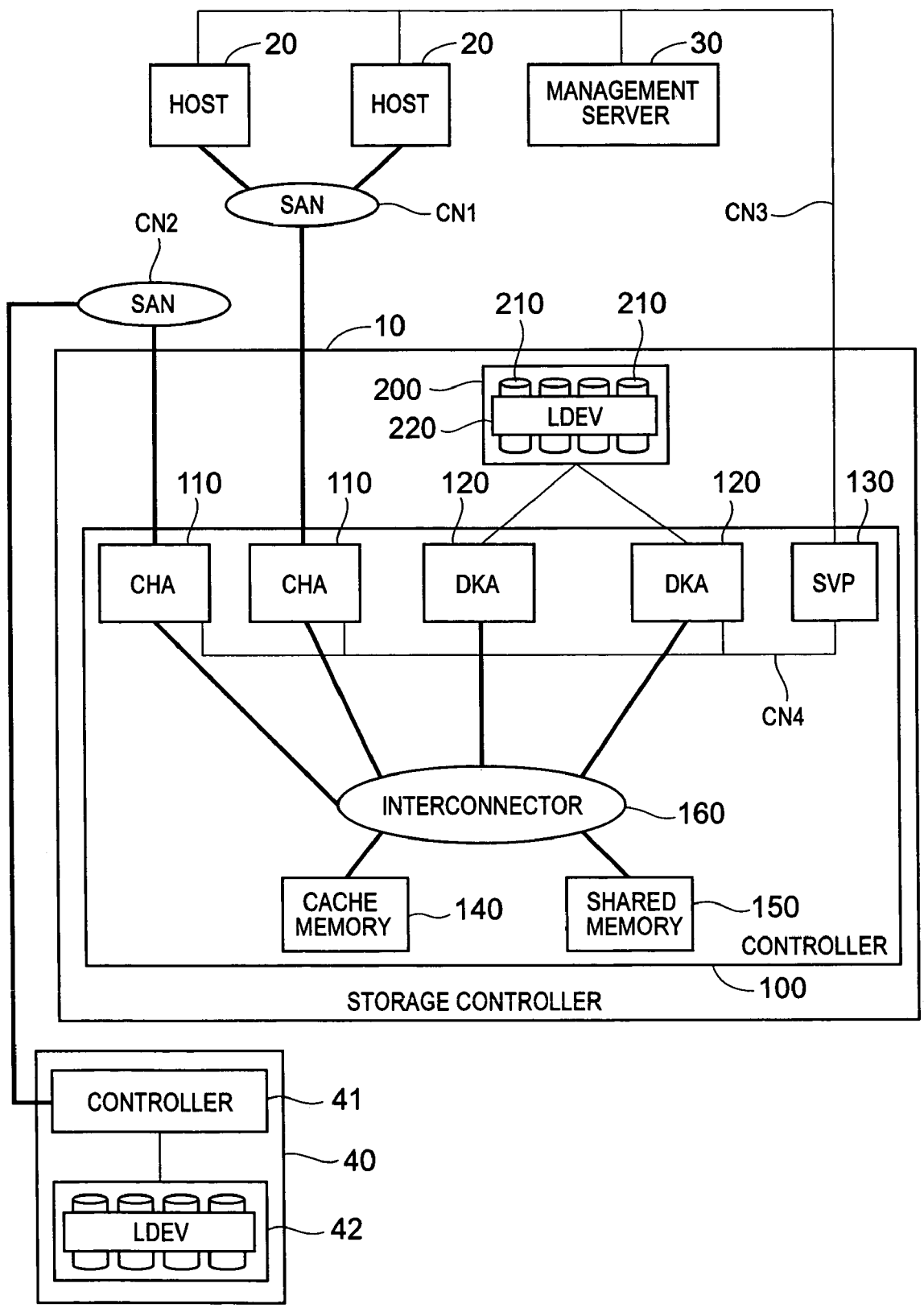
FIG. 2 is a schematic diagram showing the overall configuration of a storage system comprising a storage controller.

FIG. 2 is a schematic diagram showing the overall configuration of a storage system comprising a storage controller 10 according to this embodiment. This storage system, for example, comprises one or a plurality of storage controllers 10, one or a plurality of hosts 20, and at least one management server 30. The storage system can also comprise another storage controller 40. The storage controller 10 corresponds to the storage controller 1 in FIG. 1. The host 20 corresponds to the host 2 in FIG. 1. The management server 30 and the other storage controller 40 are omitted in FIG. 1. Details concerning the storage controller 10, host 20, and management server 30 will be described respectively.

The network configuration of the storage system will be explained. The respective hosts 20 and storage controllers 10, for example, are intercommunicably connected via a SAN or other such communication network CN1. An IP_SAN, which utilizes the IP (Internet Protocol), can be used, and an FC_SAN, which utilizes the FCP (Fibre Channel Protocol), can also be used.

The management server 30, for example, is intercommunicably connected to the respective hosts 20 and storage controllers 10 via a management communication network CN3 like a LAN (Local Area Network). Furthermore, when the storage system comprises an external storage controller 40, the management server 30 and external storage controller 40 can also be intercommunicably connected via communication network CN3.

Furthermore, FIG. 2 shows a case in which a data input/output network CN1 is separated from a management network CN3, but the present invention is not limited to this, and can be constituted such that the input/output and management of data is carried out using a single communication network. For example, the constitution can be such that the present invention only comprises the communication network CN1 and the management communication network CN3 is done away with.

Since the external storage controller 40 is a separate storage controller that exists externally to the storage controller 10, it is called an external storage controller in this embodiment. The external storage controller 40 is connected to the storage controller 10 via a communication network for external connection CN2, such as a SAN. Furthermore, the constitution can also be such that the external connection communication network CN2 is done away with, and the storage controller 10 and external storage controller 40 are connected via the data input/output network CN1.

The configuration of the storage controller 10 will be explained. The storage controller 10, for example, comprises a controller 100 and a hard disk mounting unit 200. The controller 100 comprises at least one or more channel adapters (hereinafter, CHA) 110, at least one or more disk adapters (hereinafter, DKA) 120, a service processor (hereinafter, SVP) 130, a cache memory 140, a shared memory 150, and an interconnector 160. A plurality of both CHA 110 and DKA 120 are disposed inside the controller 100.

A CHA 110 is for controlling data communications with a host 20, and, for example, is constituted as a computer device comprising a microprocessor and a local memory. The respective CHA 110 comprise at least one or more communication ports. For example, identification information such as WWN (World Wide Name) is set in the communication port. When a host 20 and the storage controller 10 carry out data communications using iSCSI (internet Small Computer System Interface), an IP (Internet Protocol) address and other such identification information is set in the communication port.

Two types of CHA 110 are shown in FIG. 2. The one CHA 110 located in the left side of FIG. 2 is for receiving and processing a command from a host 20, and the communication port thereof becomes the target port. The other CHA 110 located in the right side of FIG. 2 is for issuing a command to the external storage controller 40, and the communication port thereof becomes the initiator port.

A DKA 120 is for controlling data communications with the respective disk drives 210, and similar to a CHA 110, is constituted as a computer device comprising a microprocessor and a local memory.

A DKA 120 and the respective disk drives 210, for example, are connected via a communication channel, which conforms to the Fibre Channel Protocol. A DKA 120 and the respective disk drives 210 carry out data transfer in block units. The channel for the controller 100 to access the respective disk drives 210 is made redundant. Even if a failure occurs in either one of the DKA 120 or communication channels, the controller 100 is able to access a disk drive 210 using the other DKA 120 and communication channel. Similarly, the channel between a host and the controller 100 and the channel between the external storage controller 40 and the controller 100 can also be made redundant. Furthermore, a DKA 120 constantly monitors the status of a disk drive 210. The SVP 130 acquires the results of monitoring by a DKA 120 via an internal network CN4.

The operations of the CHA 110 and DKA 120 will be briefly explained. The CHA 110, upon receiving a read command issued from a host 20, stores this read command in the shared memory 150. The DKA 120 constantly references the shared memory 150, and upon discovering an unprocessed read command, reads out data from a disk drive 210 and stores this data in the cache memory 140. The CHA 110 reads out the data transferred to the cache memory 140, and sends this data to the host 20.

Conversely, upon receiving a write command issued from a host 20, the CHA 110 stores this write command in the shared memory 150. Also, the CHA 110 stores the received write data in the cache memory 140. The CHA 110 reports write-complete to the host 20 after storing the write data in the cache memory 140. The DKA 120 reads out the data stored in the cache memory 140 in accordance with the write command stored in the shared memory 150, and stores this write data in a prescribed storage device 210.

The SVP 130 is communicably connected to the CHA 110 and the DKA 120 via an internal network CN4 such as a LAN (Local Area Network). Further, the SVP 130 is connected to the management server 30 via a communication network CN3 such as a LAN or the Internet. The SVP 130 gathers the respective statuses inside the storage controller 10, and provides these statuses to the management server 30. The SVP 130 configures the configuration of the storage controller 10 and the threshold of the virtual memory in accordance with an indication from the management server 30. Furthermore, the SVP 130 can be connected to just one of either the CHA 110 or DKA 120. This is because the SVP 130 can gather various status information via the shared memory 150.

The cache memory 140, for example, is for storing data received from a host 20. The cache memory 140, for example, is constituted from a volatile memory. The shared memory 150, for example, is constituted from a nonvolatile memory. For example, various types of management information, which will be explained hereinbelow, are stored in the shared memory 150.

The shared memory 150 and the cache memory 140 can be respectively constituted as individual memory boards, or they can be combined and provided on the same memory board. Or, one portion of memory can be used as a cache area, and the other portion can be used as a control area.

The interconnector 160 interconnects the respective CHA 110, DKA 120, cache memory 140, and shared memory 150. Consequently, all the CHA 110 and DKA 120 can respectively access the cache memory 140 and the shared memory 150. The interconnector 160, for example, is constituted as a crossbar switch or the like.

The configuration of the controller 100 is not limited to the configuration described above. For example, the constitution can be such that a function for respectively carrying out data communications with a host 20 and the external storage controller 40, a function for carrying out data communications with a disk drive 210, and a function for storing data and various types of management information are respectively provided on one or a plurality of control boards. Using a control board like this enables the external dimensions of the storage controller 10 to be made smaller.

The configuration of the hard disk mounting unit 200 will be explained. The hard disk mounting unit 200 comprises a plurality of disk drives 210. For example, FC disks, SATA disks, and other such types of hard disk drives can be used as the disk drives 210.

A parity group, the configuration of which will differ in accordance with the RAID configuration, for example, is constituted by a prescribed number of disk drives 210 of three-per-group or four-per-group. A parity group is for virtualizing the physical storage areas possessed by the respective disk drives 210 inside the parity group. A parity group is a virtualized physical storage device.

Either one or a plurality of logical devices (LDEV: Logical DEVice) 220 of either a prescribed size or a variable size can be set in a physical storage area, which has a parity group. A logical device 220 is a logical storage device, and corresponds to a logical volume.

The external storage controller 40, for example, can comprise a controller 41 and a hard disk mounting unit 42 the same as the storage controller 10. The controller 41 uses a disk drive storage area to create a logical volume.

The external storage controller 40 is called an external storage controller because it exists outside of the storage controller 10 as viewed from the storage controller 10. Further, a disk drive of the external storage controller 40 may be called an external disk, and a logical volume of the external storage controller 40 may be called an external volume.

For example, a logical volume inside the external storage controller 40 is made correspondent to a virtual device (VDEV: Virtual DEVice) disposed inside the storage controller 10 via the communication network CN2 or the like. Then, a virtual volume can be established on the storage area of a virtual device. Therefore, the storage controller 10 can make the host 20 view a logical volume (external volume) inside the external storage controller 40 just as if it is a logical volume inside the storage controller 10.

When an access request is generated for a virtual volume, the storage controller 10 converts an access request command related to the virtual volume to a command for accessing a logical volume inside the external storage controller 40. The converted command is sent to the external storage controller 40 from the storage controller 10 via the communication network CN2. The external storage controller 40 carries out data read/write in accordance with the command received from the storage controller 10, and returns the results thereof to the storage controller 10.

Thus, the storage controller 10 can utilize a storage resource (external volume) inside another storage controller 40 that exists externally as if it is a storage resource inside the storage controller 10. Therefore, the storage controller 10 does not necessarily have to comprise a disk drive 210 and DKA 120. This is because the storage controller 10 can utilize a storage resource provided by a hard disk inside the external storage controller 40. The storage controller 10 can also be constituted as a high-functionality fibre channel switch.

Figure 3:
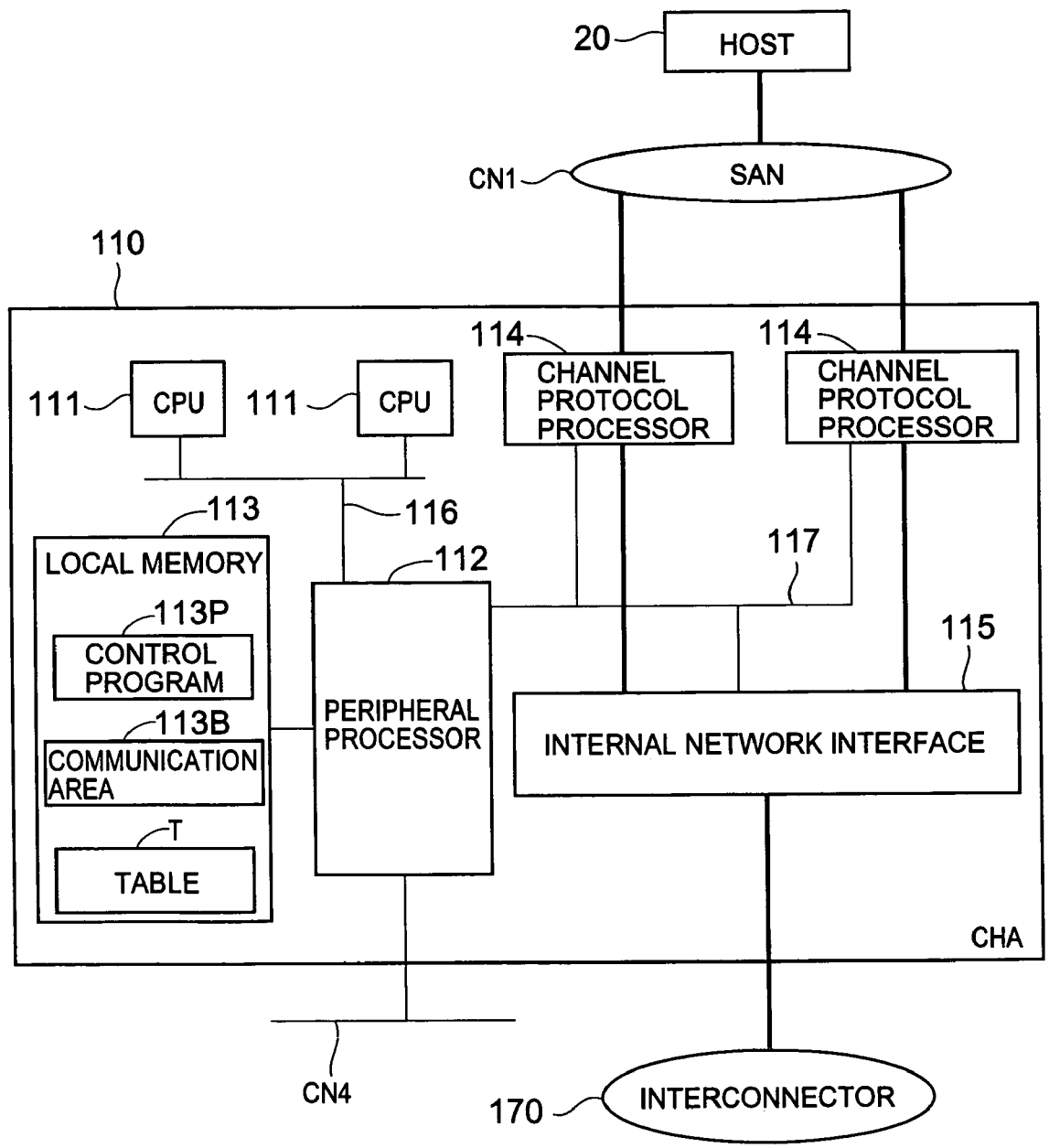
FIG. 3 is a schematic diagram showing the configuration of a channel adapter.

FIG. 3 is a schematic diagram showing the configuration of a CHA 110. A CHA 110, for example, comprises a plurality of microprocessors (CPU) 111; a peripheral processor 112; local memory 113; a plurality of channel protocol processors 114; and an internal network interface 115.

The respective microprocessors 111 are connected to the peripheral processor 112 via a bus 116. The peripheral processor 112 is connected to the local memory 113, and controls the operation of the local memory 113. Furthermore, the peripheral processor 112 is connected to the respective channel protocol processors 114 via a bus 117. The peripheral processor 112 processes packets respectively inputted from the respective microprocessors 111, the respective channel protocol processors 114 and the internal network interface 115. For example, when the local memory 113 is the transfer destination of a packet, the peripheral processor 112 processes this packet, and, if necessary, returns the processing result to the packet source. The internal network interface 115 is a circuit for communications with other CHA 110, DKA 120, the cache memory 140, and the shared memory 150 via the interconnector 160.

Inside the local memory 113, for example, there are stored a control program 113P, a communication area 113B, and various tables T. The respective microprocessors 111 read out and execute the control program 113P. The respective microprocessors 111 carry out communications with other microprocessors 111 via the communication area 113B.

The original data of the various tables T resides inside the shared memory 150. That is, at least a portion of the data of the various tables T inside the shared memory 150 is copied inside the local memory 113 as needed.

The channel protocol processor 114 executes processing for carrying out communications with the host 20. The channel protocol processor 114, upon receiving an access request from the host 20, notifies the microprocessor 111 of a number, LUN (Logical Unit Number), access destination address and so forth for identifying this host 20.

Based on the contents notified from the channel protocol processor 114, the microprocessor 111 creates a transfer list for sending the read request-targeted data to the host 20. The channel protocol processor 114 reads out the data from either of the cache memory 140 or the flash memory device 120 on the basis of the transfer list, and sends this data to the host 20.

In the case of a write request, the microprocessor 111 sets a storage destination address for the write data in the transfer list. The channel protocol processor 114 transfers the write data to the cache memory 140 based on the transfer list. Furthermore, although the contents of the control program 113P are different, the DKA 120 is substantially configured the same as the CHA 110.

Figure 4:
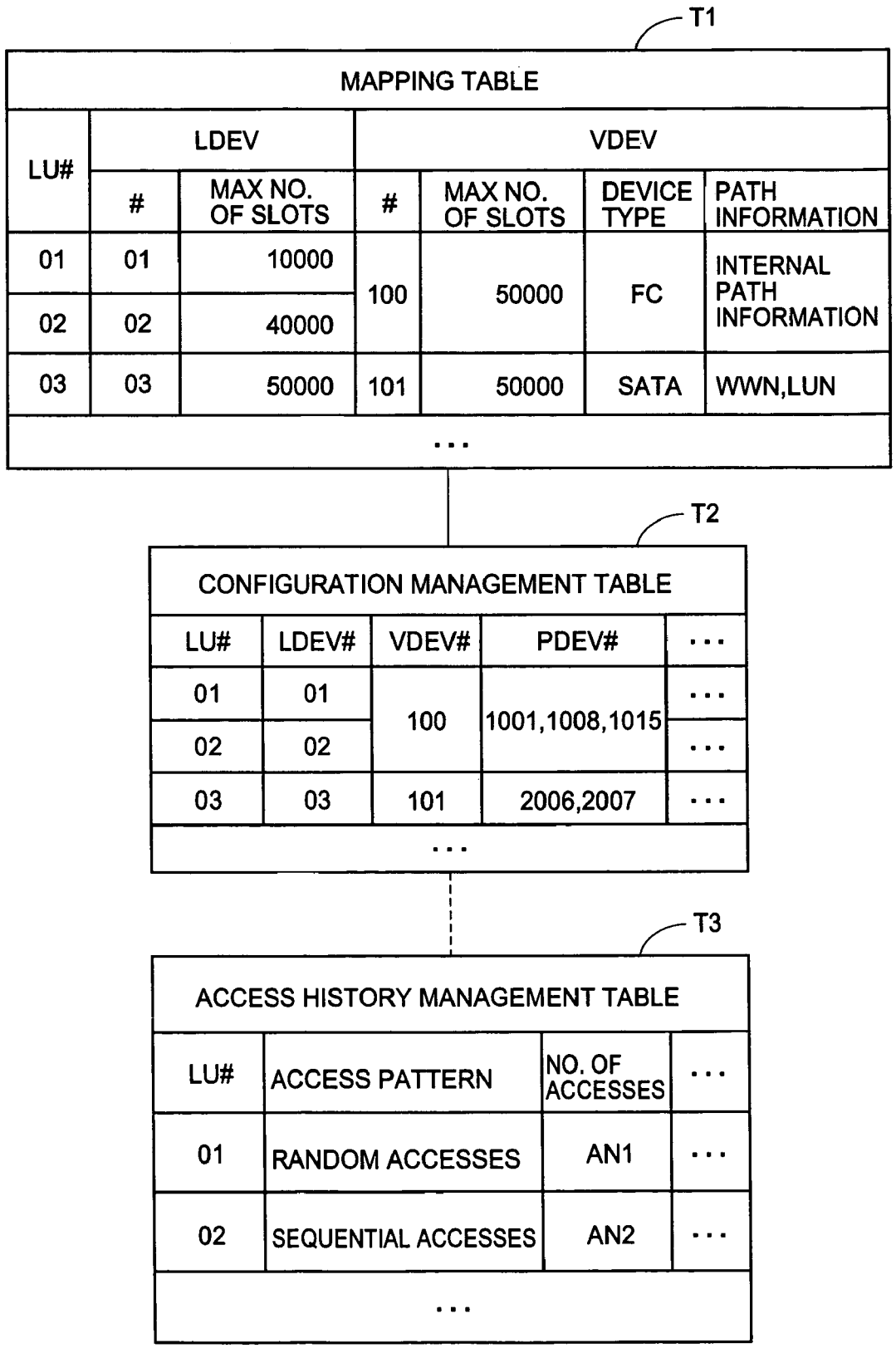
FIG. 4 is a schematic diagram showing the configuration of a mapping table and other such tables.

FIG. 4 is a schematic diagram showing examples of a mapping table T1, a configuration management table T2, and an access history management table T3. As described hereinabove, the respective tables T1 through T3 are stored in their entirety in the shared memory 150, and portions of the data of the respective tables T1 through T3 are copied into the local memories 113 of the respective CHA 110 and respective DKA 120 as needed.

The mapping table T1 is used to enable the storage controller 10 to make use of a logical volume (that is, a disk drive) inside the other storage controller 40. The mapping table T1, for example, can be configured by making a LUN, a number for identifying a logical device (LDEV), and a number for identifying a virtual intermediate device (VDEV) correspondent to one another.

The information for identifying a virtual intermediate device, for example, can comprise a virtual intermediate device number, information showing the type of physical storage device to which the virtual intermediate device is connected, and path information for connecting to a physical storage device. When a virtual intermediate device is correspondent to a disk drive 210 inside the storage controller 10, internal path information for accessing the disk drive 210 is set.

When a virtual intermediate device is connected to a logical volume inside the external storage controller 40, external path information required for accessing this logical volume is set. External path information, for example, comprises a WWN or LUN. The controller 100 of the storage controller 10 converts to a command for sending a command received from the host 20 to the external storage controller 40 by referencing the mapping table T1.

The configuration management table T2 is a table for managing the configuration of a logical volume managed by the storage controller 10. The configuration management table T2, for example, manages a number (LU#) for identifying a logical volume, a number (LDEV#) for identifying the logical device correspondent to this logical volume, a number (VDEV#) for identifying the virtual intermediate device correspondent to this logical device, and a number (PDEV#) for identifying the physical storage device correspondent to this virtual intermediate device.

Furthermore, when a logical volume provided to the storage controller 10 is created as a virtual volume, which uses an AOU function (hereinafter, also called an AOU volume), information related to the configuration of the AOU volume can be stored in the configuration management table T2. The AOU function is a function for making a storage area, which has been pooled, correspondent to a logical volume in accordance with an access from the host 20. That is, an AOU volume is created by gathering together pooled storage areas as needed. The AOU function makes it possible to create a volume of a required size when necessary.

The access history management table T3 is a table for managing the history of the utilization status of a logical volume by the host 20. The access history management table T3, for example, can correspondingly manage a number for identifying a logical volume, an access pattern, and a number of accesses. An access pattern signifies the pattern resulting from the host 20 accessing a logical volume, and a value showing either random access or sequential access is set.

Figure 5:
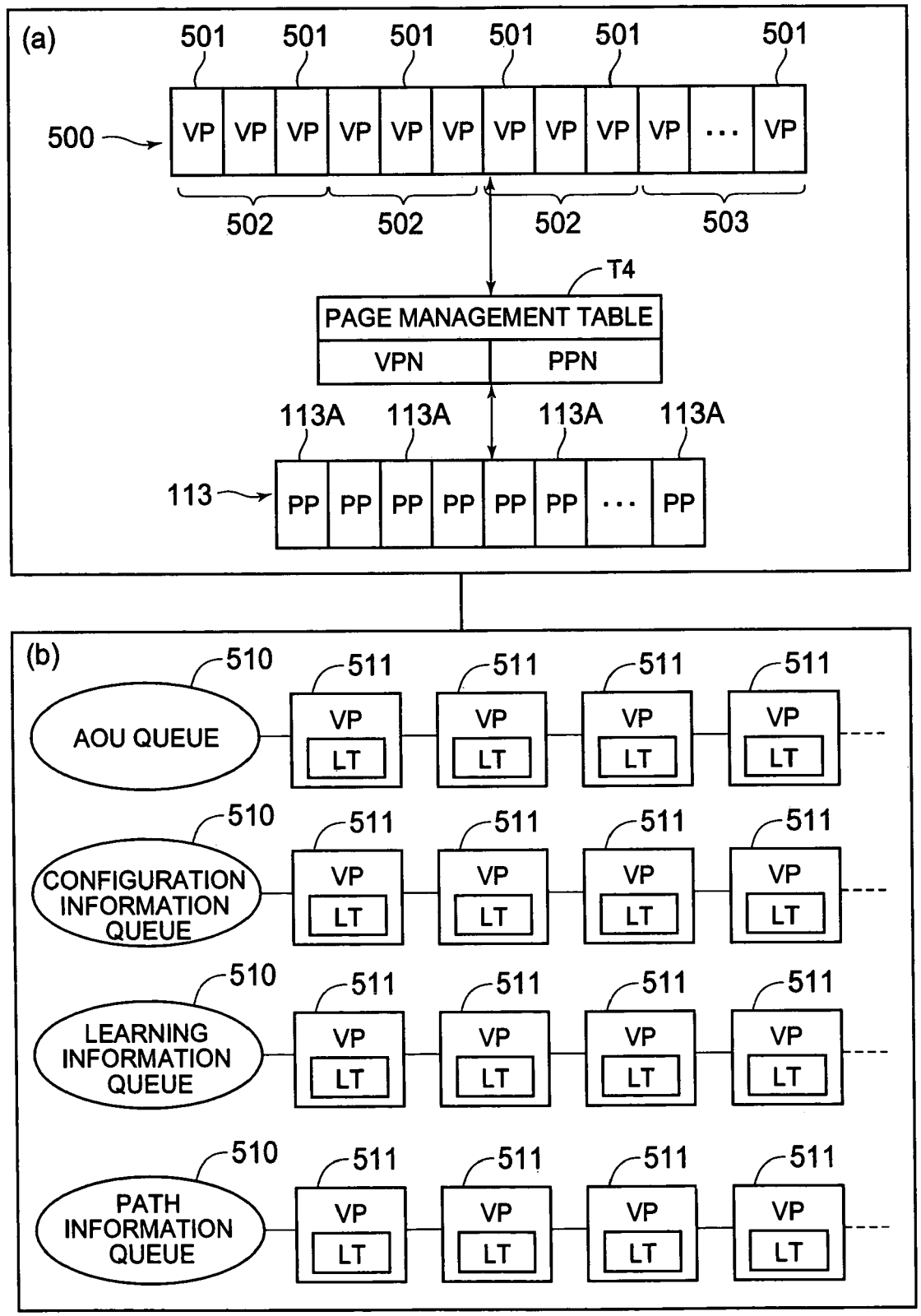
FIG. 5 is a schematic diagram showing a method for managing a virtual memory.

FIG. 5 is a diagram schematically showing a virtual memory management method according to this embodiment. As shown in FIG. 5A, a storage area of the local memory 113, for example, is managed in units of 512-byte pages 113A. Since this is a physical page, "PP" is shown in the figure.

A virtual memory 500 is also managed in units of 512-byte pages 501. Since these are virtual pages, "VP" is shown in the figure. Setting both the size of a physical page 113A and the size of a virtual page 501 to 512 bytes makes it possible to simplify the control configuration. However, the present invention is not limited to this, and the constitution can also be such that the size of a physical page 113A and the size of a virtual page 501 are different.

Page numbers for identifying both a physical page 113A and a virtual page 501 are set in advance. The page number for a physical page 113A is shown as "PPN" and the page number for a virtual page 501 is shown as "VPN". A page management table T4 correspondingly manages a virtual page number VPN and a physical page number PPN. An access to a virtual page 501 is converted to an access to the physical page 113A corresponding to this virtual page in accordance with the page management table T4.

The respective virtual pages 501 of the virtual memory 500 are utilized by a prescribed function (AOU function and so forth) in accordance with being registered in a queue 510. An area 502 of the virtual memory 500 storage area (all of the virtual pages 501), which is allocated to one or another function, can be called either a partitioned area or an allocated area. An area 503 of the virtual memory 500 storage area, which is not allocated to any of the functions, can be called either an unused area or a free space.

FIG. 5B shows a queue structure for partitioning and managing the virtual memory 500 by respective prescribed functions. The prescribed functions, for example, can include an AOU function, a function for managing the configuration of the storage controller 10, a function for studying and managing the access pattern of the host 20, and a function for managing the configuration of the communication channel between the host 20 and a logical volume. These functions are examples, and the present invention is not limited to the functions described above. For example, a function for copying data and other such functions are also applicable to the present invention.

A queue 510 is provided for each prescribed function. At least one or more virtual page management data 511 are linked to each queue 510 for specifying a virtual page 501 to be used by this function. Virtual page management data 511 can include the time at which a virtual page 501 was last used (shown as LT in the figure).

Figure 6:
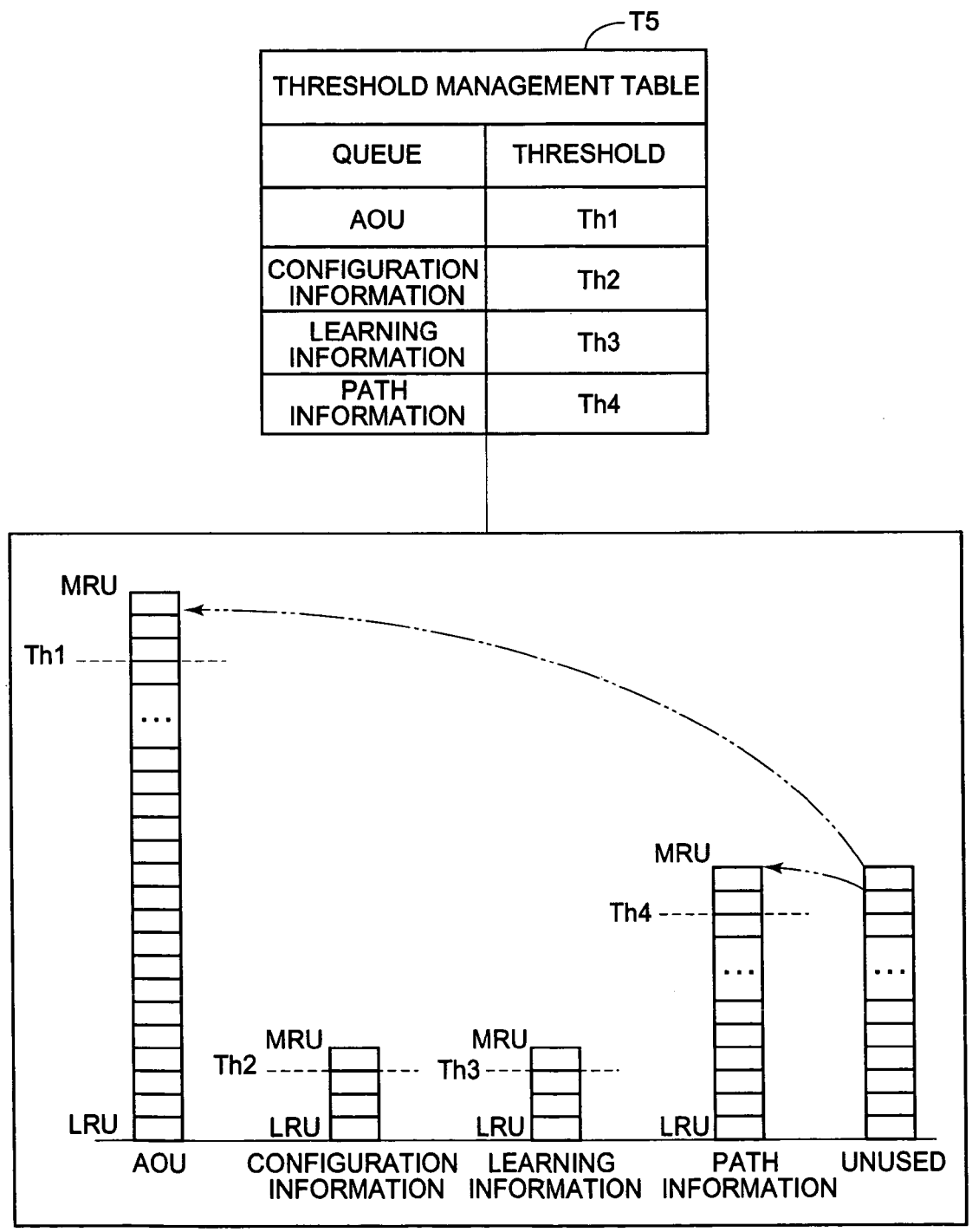
FIG. 6 is a schematic diagram showing the configuration of a threshold management table.

FIG. 6 is a schematic diagram showing the virtual memory capacity allocated to a threshold management table T5 and the respective queues 510 (that is, the respective functions). The threshold management table T5 shown in the upper portion of FIG. 6 is a table for managing the threshold Th set in each queue 510. The threshold Th stipulates the virtual memory capacity (number of virtual pages) minimally allocated to the respective queues 510. In other words, the portion of virtual memory capacity, which exceeds the threshold Th, can be taken from this queue and allocated to another queue.

As shown in the lower portion of FIG. 6, virtual pages are allocated from the unused virtual pages 501 to the queues 510 in virtual page units. Virtual pages of at least the respective thresholds Th or greater are allocated to the respective queues 510. That is, virtual pages of a quantity, which exceeds the threshold Th, are allocated until the page reservation requests related to the respective queues 510 are satisfied.

Figure 7:
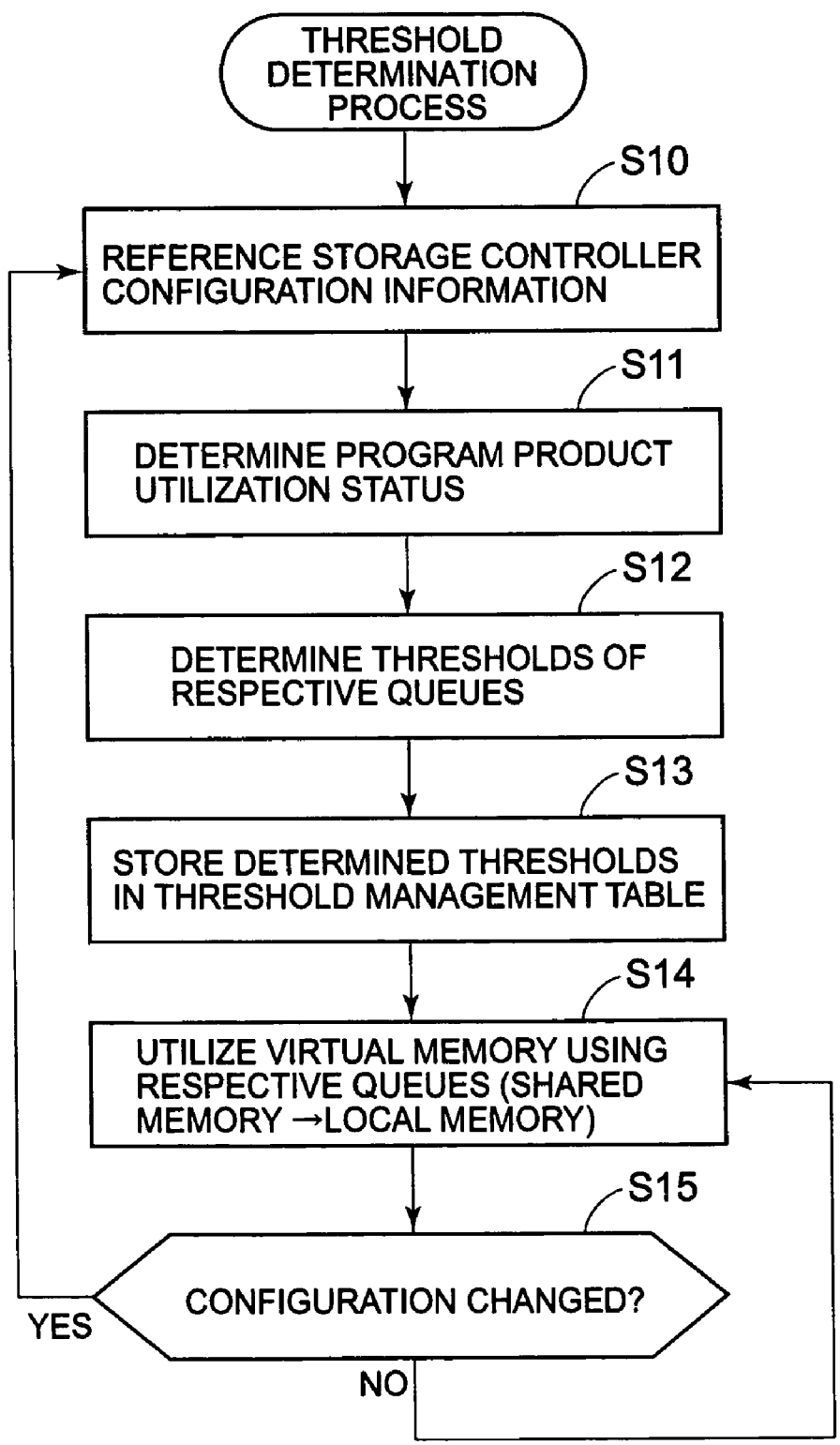
FIG. 7 is a flowchart showing a threshold determination process.

FIG. 7 is a flowchart showing a process for determining a threshold Th. The respective flowcharts shown hereinbelow provide outlines of processing within the scope needed to understand and implement the present invention, and may differ from an actual computer program. A so-called person skilled in the art will be able to change the steps in the flowcharts, and to add other steps.

The controller 100 references the configuration information of the storage controller 10 (T2 and/or T3) (S10), and, in addition, determines the utilization statuses of the respective program products (S11). That is, the controller 100 determines which program product is running, and which are scheduled to run.

The controller 100 determines thresholds Th for the respective queues 510 associated to the respective program products (S12). For example, a user can manually set a value for a threshold Th from the management server 30 via the SVP 130. Or the controller 100 can be constituted so as to automatically select a preset initial threshold.

The controller 100 stores the determined thresholds Th in the threshold management table T5 (S13). Virtual pages of not less than the threshold Th are registered in a queue 510 as the result of a page reservation process, which will be explained hereinbelow. The respective program products copy required data, of the data of the various management information (various tables T) stored in the shared memory 150, to the virtual pages registered in a queue 510, and use this data (S14).

Next, the controller 100 determines whether or not the configuration of the storage controller 10 has changed (S15). That is, the controller 100 can execute a threshold determination process triggered by a configuration change of the storage controller 10. A configuration change of the storage controller 10, for example, can include the creation of a logical volume, a change of logical volumes connected to the host 20, an increase or decrease of disk drives 210, and so forth. A user can indicate a configuration change of the storage controller 10 from the management server 30 via the SVP 130. Furthermore, the constitution can be such that the host 20 comprises a function for managing the configuration of the storage controller 10. In this case, the user can indicate a configuration change for the storage controller 10 by using the storage controller management function inside the host 20.

When a configuration change is indicated (S15: YES), the controller 100 returns to S10. When a configuration change is not indicated (S15: NO), the controller 100 returns to S14, and partitions and uses the virtual memory 500 in accordance with the respective functions.

Figure 8:
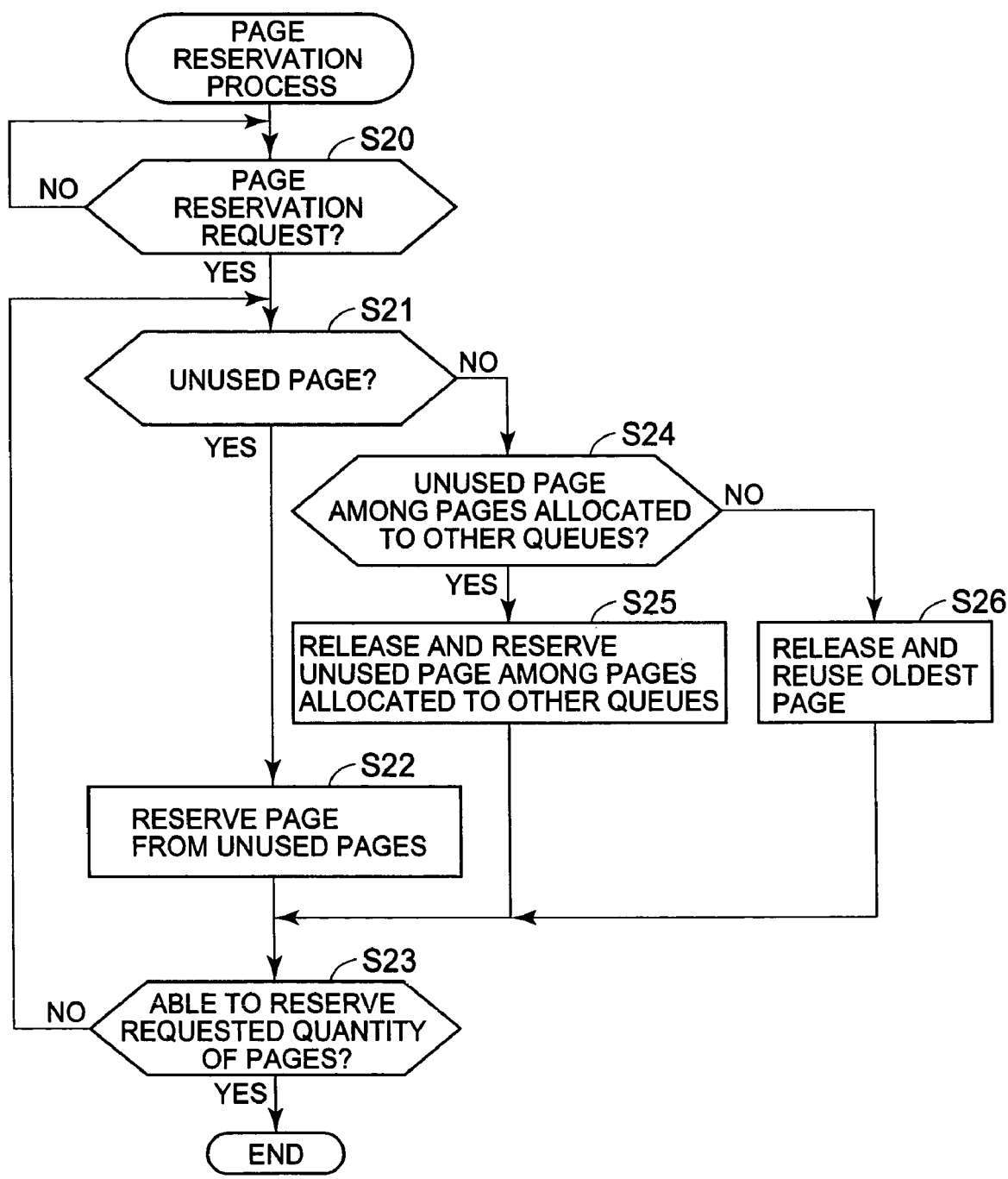
FIG. 8 is a flowchart showing a process for reserving a virtual page.

FIG. 8 is a flowchart showing a page reservation process for allocating virtual pages to the respective queues 510. The respective program products request virtual memory capacity to be allocated to themselves in accordance with increases in throughput (S20).

When a request to reserve a virtual page is made from a program product (S20: YES), the controller 100 determines whether or not a virtual page is remaining in the unused area (S21). When a virtual page is remaining in the unused area (S21: YES), the controller 100 allocates the virtual page in the unused area to the program product, which requested that a page be reserved (S22), and determines whether or not the requested quantity of virtual pages could be reserved (S23). That is, the controller 100 determines whether or not it was possible to allocate the quantity of virtual pages desired by the program product (S23).

When it was possible to allocate the quantity of program product-requested virtual pages to this program product (S23: YES), this processing ends. When it is not possible to allocate the quantity of program product-requested virtual pages to this program product (S23: NO), the controller 100 returns to S21. Therefore, preference is given to allocating a virtual page from inside the unused storage area (unallocated virtual page) to the program product.

When another program product makes a request to reserve a virtual page (S20: YES), a virtual page of inside the unused area is preferentially allocated the same as described hereinabove. Then, when the further allocation of a virtual page is requested subsequent to running out of virtual pages in the unused area (S21: NO), the controller 100 determines whether or not an unused virtual page exists in the virtual pages allocated to another queue 510 (that is, another program product) (S24). An unused virtual page, for example, is a virtual page, which has not been used within a recent prescribed time period.

When a virtual page, which has not been used recently, is detected among the virtual pages allocated to another queue 510 (S24: YES), the controller 100 releases this recently unused virtual page from the current queue 510, and registers same in the queue 510 of the program product, which desires the addition of a virtual page (S25).

Thus, in this embodiment, subsequent to using up the virtual pages of the unused area, a virtual page, which is deemed unnecessary from among the virtual pages allocated to other program products, is utilized.

When a recently unused virtual page cannot be found among the virtual page groups already allocated to all the program products (S24: NO), the controller 100 releases the oldest virtual page from among the virtual pages allocated to the program product, which requested the reservation of a virtual page in S20, and allocates this page to this program product once again (S26).

Thus, in this embodiment, when an unnecessary virtual page cannot be taken and used from among the virtual pages allocated to other program products, a virtual page allocated to the program product, which requested the page reservation, is reused.

Therefore, the virtual page selection order when allocating a virtual page to a program product is first, a virtual page inside the unused area, second, a virtual page deemed unnecessary for another program product, and third, the oldest virtual page of the requesting program product itself.

Furthermore, although there will be differences according to the number of product programs executed at storage controller 10 startup (that is, the number of queues 510), since a large number of virtual pages resides inside the unused area, these unused virtual pages will most likely be allocated to the respective program products when the storage controller 10 starts up. Then, for example, when there is an increase in access frequency from the host 20, or the number of booted program products increases, the second virtual page selection order is used. Furthermore, when a program product requests a virtual page, the third selection order is used.

Figure 9:
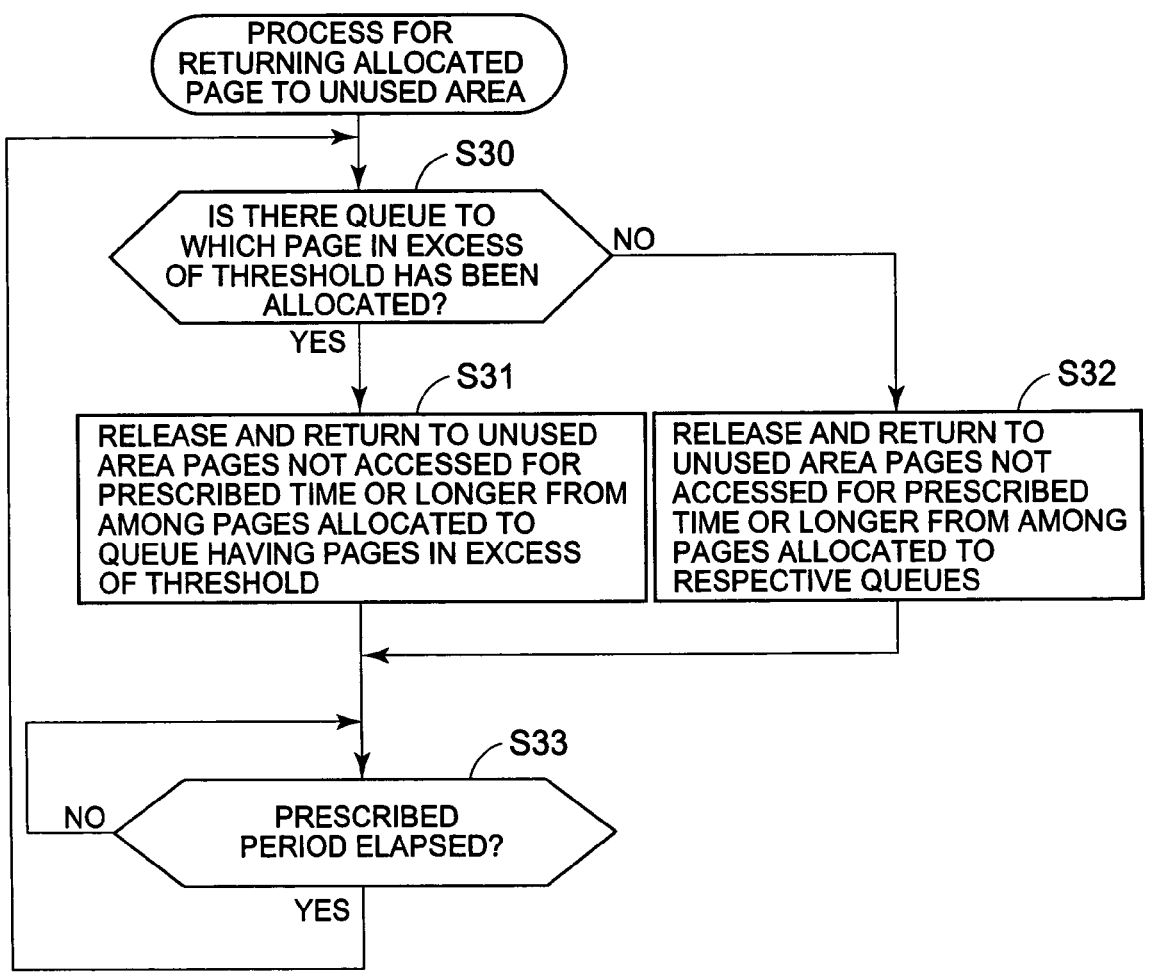
FIG. 9 is a flowchart showing a process for releasing an allocated virtual page and returning same to an unused area.

FIG. 9 is a flowchart showing a process for returning virtual pages allocated to the respective program products to the unused area. The controller 100 checks whether or not a queue 510 exists to which virtual pages in excess of a threshold have been allocated (S30).

When a queue 510 with virtual pages in excess of a threshold exists (S30: YES), the controller 100 releases a virtual page, which has not been accessed for a prescribed period of time or longer, from among the respective virtual pages registered in the queue 510 having virtual pages in excess of this threshold, and returns this virtual page to the unused area (S31).

When a queue 510 with virtual pages in excess of a threshold does not exist (S30: NO), the controller 100 releases virtual pages, which have not been accessed for a prescribed period of time or longer, from among the virtual pages registered in the respective queues 510, and returns these virtual pages to the unused area (S32).

The controller 100 waits for the passage of a prescribed period (S33), and when the prescribed period has elapsed (S33: YES), returns processing to S30. That is, this process is executed every prescribed period, and a virtual page, which has not been used for a prescribed period of time or longer, is forcibly returned to the unused area. Furthermore, the first prescribed period of time in S31 and the second prescribed period of time in S32 can both be set to the same value, or can each be set to a different value. The page reservation process and the process for returning an allocated virtual page to the unused area described hereinabove operate independently of one another.

Because this embodiment comprises the above-described constitution, it is possible to curb the impact that virtual memory capacity allocated to one program product has on the virtual memory capacity allocated to another program product even when a plurality of program products are running at the same time.

Therefore, even when a plurality of program products, which are executed by a plurality of microprocessors, co-exist and run at the same time, it is possible to reduce the occurrence of hit under miss accesses, to run the respective program products smoothly, and to make effective use of a virtual memory of limited size.

Second Embodiment

Figure 10:
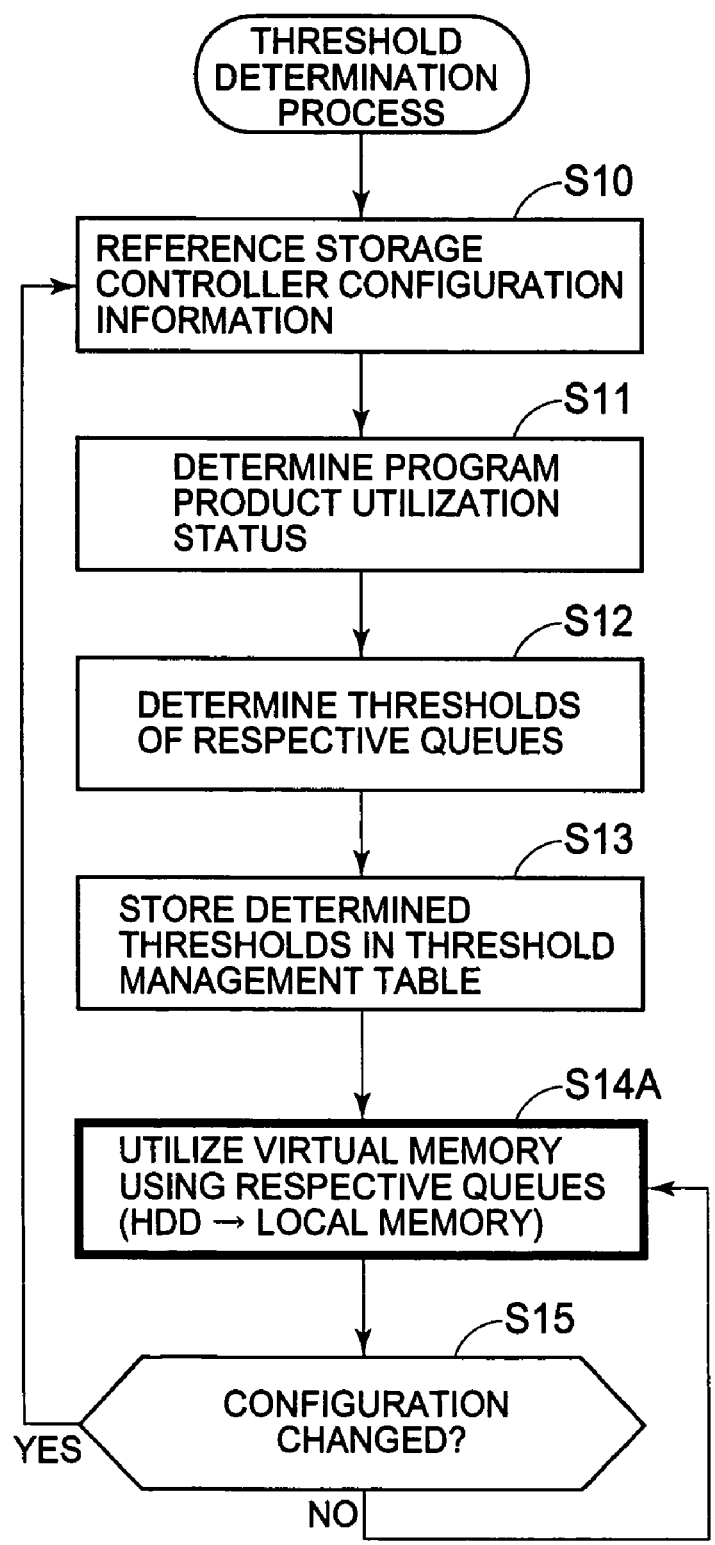
FIG. 10 is a flowchart showing a threshold determination process executed by a storage controller of a second embodiment.

A second embodiment of the present invention will be explained based on FIG. 10. This embodiment corresponds to a variation of the first embodiment. FIG. 10 is a flowchart of a threshold determination process according to this embodiment. In this embodiment, at least a portion of the data stored in a storage area of a disk drive 210 is copied to a partitioned area inside the virtual memory as needed. Constituting this embodiment in this way also exhibits the same effects as those of the first embodiment described hereinabove.

Furthermore, the present invention is not limited to the embodiments described hereinabove. A person skilled in the art will be able to make various additions and changes without departing from the scope of the present invention.

What is claimed is:

1. A storage controller, which provides a storage area to a higher-level device, comprising:
   a higher-level communication controller for controlling communications with the higher-level device;
   a lower-level communication controller for controlling communications with a storage device; and
   a shared memory area, which is shared by the higher-level communication controller and the lower-level communication controller,
   the higher-level communication controller and the lower-level communication controller respectively comprising:
   a plurality of communication interfaces for communications with a communication partner;
   a microprocessor for using the communication interfaces to control a data transfer with the communication partner; and
   a virtual memory controller, which creates a virtual memory to be associated with a storage area of a physical memory,
   the virtual memory controller respectively allocating a virtual memory capacity to each of a prescribed plurality of functions realized by the microprocessor, and variably controlling the virtual memory capacity allocated to the respective prescribed functions,
   the virtual memory controller respectively controls the virtual memory capacity allocated to the prescribed functions using a capacity management queue for managing the virtual memory capacity prepared for each prescribed function, and
   the virtual memory controller manages an unused capacity not allocated to any of the prescribed functions from among a total capacity of the virtual memory, using an unused capacity management queue.

2. The storage controller according to claim 1, wherein at least a portion of prescribed data stored in the shared storage area is copied to the virtual memory for each of the prescribed functions.

3. The storage controller according to claim 1, wherein the virtual memory controller allocates the virtual memory capacity of at least a threshold or greater to the prescribed functions using a minimum value management table for respectively managing a threshold of the virtual memory capacity allocated to each of the prescribed functions.

4. The storage controller according to claim 3, wherein the threshold is either automatically or manually set when a configuration of the storage controller is changed.

5. The storage controller according to claim 3, wherein the virtual memory controller allocates the virtual memory capacity of at least the threshold or greater, in preset prescribed units, to the prescribed functions.

6. The storage controller according to claim 3, wherein the virtual memory controller allocates the virtual memory capacity of at least the threshold or greater to the prescribed functions by allocating an unused capacity of the total capacity of the virtual memory to the prescribed functions in preset prescribed units.

7. The storage controller according to claim 1, wherein the virtual memory controller checks whether or not an unused virtual memory capacity exists in a prescribed function to which the virtual memory capacity of not less than a threshold has been allocated among the prescribed functions, and if the unused virtual memory capacity exists, manages this unused virtual memory capacity as the unused capacity.

8. The storage controller according to claim 1, wherein the virtual memory controller respectively checks whether or not an unused virtual memory capacity exists in the virtual memory capacities allocated to the prescribed functions, and when the unused virtual memory capacity exists, manages this unused virtual memory capacity as the unused capacity.

9. The storage controller according to claim 1, wherein the virtual memory controller determines whether or not a prescribed function to which virtual memory capacity of not less than a threshold has been allocated exists among the prescribed functions, and
   (1A) upon detecting the prescribed function to which the virtual memory capacity of not less than the threshold has been allocated,
   (1B) checks whether or not the unused virtual memory capacity exists in the virtual memory capacity allocated to this detected prescribed function, and
   (1C) upon determining that the unused virtual memory capacity exists, manages this unused virtual memory capacity as the unused capacity, and
   (2A) when unable to find the prescribed function to which the virtual memory capacity of not less than the threshold has been allocated,
   (2B) checks whether or not unused virtual memory capacity exists among the virtual memory capacities respectively allocated to the prescribed functions, and
   (2C) when unused virtual memory capacity exists, manages this unused virtual memory capacity as the unused capacity.

10. The storage controller according to claim 1, wherein the virtual memory controller reallocates an unused virtual memory capacity of the virtual memory capacities allocated to the prescribed functions to another prescribed function in preset prescribed units.

11. The storage controller according to claim 1, wherein the virtual memory controller releases and reuses, in preset prescribed units, the oldest virtual memory capacity of the virtual memory capacities allocated to the prescribed functions.

12. The storage controller according to claim 1, wherein the shared memory area is either one of a control memory shared by the higher-level communication controller and the lower-level communication controller, or a storage area, inside a storage device, shared by the higher-level communication controller and the lower-level communication controller.

13. The storage controller according to claim 1, wherein the prescribed data comprises at least any two or more of: data showing a configuration of a logical volume provided to the higher-level device, data showing a configuration of the storage controller, data showing a pattern of access requests issued from the higher-level device, or data showing a connection configuration between a logical volume provided to the higher-level device and the higher-level device.

14. A method for controlling virtual memory inside a storage controller, the storage controller including: a higher-level communication controller for controlling communications with a higher-level device; a lower-level communication controller for controlling communications with a storage device; and a shared memory area, which is shared by the higher-level communication controller and the lower-level communication controller, the higher-level communication controller and the lower-level communication controller respectively including: a communication interface for communicating with a communication partner; a plurality of microprocessors for using the communication interface to control a data transfer with the communication partner; and a virtual memory controller for creating a virtual memory to be associated with the storage area of a physical memory, when a configuration of the storage controller is changed, the virtual memory control method comprising the steps of setting a threshold of a virtual memory capacity to be allocated to each of a prescribed plurality of functions realized by the microprocessors;

variably allocating a virtual memory capacity of at least the threshold or greater to each of the prescribed functions;

releasing an unused virtual memory capacity of the virtual memory capacities allocated to the prescribed functions as an unused capacity;

controlling the virtual memory capacity allocated to the prescribed functions using a capacity management queue for managing the virtual memory capacity prepared for each of the prescribed functions; and managing an unused capacity not allocated to any of the prescribed functions from among a total capacity of the virtual memory using an unused capacity management queue.

\* \* \* \* \*